US008397527B2

(12) United States Patent
Miller

(10) Patent No.: US 8,397,527 B2
(45) Date of Patent: Mar. 19, 2013

(54) ENERGY SAVING INTEGRATED LIGHTING AND HVAC SYSTEM

(76) Inventor: Jack V. Miller, Seaford, DE (US)

( * ) Notice: Subject to any disclaimer, the term of this patent is extended or adjusted under 35 U.S.C. 154(b) by 769 days.

(21) Appl. No.: 11/881,787

(22) Filed: Jul. 30, 2007

(65) Prior Publication Data

US 2009/0032604 A1 Feb. 5, 2009

(51) Int. Cl.
*F25D 17/04* (2006.01)
(52) U.S. Cl. ........... 62/186; 236/13; 236/49.3; 454/229; 454/239; 454/345; 454/293; 362/294
(58) Field of Classification Search ............ 62/186; 236/13, 49.3; 454/229, 239, 345, 293; 362/294
See application file for complete search history.

(56) References Cited

U.S. PATENT DOCUMENTS

| | | | |
|---|---|---|---|
| 3,326,112 A * | 6/1967 | Sadlow et al. ............... 454/248 |
| 3,949,809 A * | 4/1976 | Gilles ........................ 165/210 |
| 4,105,276 A | 8/1978 | Miller |
| 4,178,535 A | 12/1979 | Miller |
| D267,978 S | 2/1983 | Miller |
| 4,682,276 A * | 7/1987 | Miller ........................ 362/294 |
| 4,941,729 A * | 7/1990 | Hardin et al. ............... 385/107 |
| 4,990,908 A * | 2/1991 | Tung ....................... 340/825.63 |
| 5,099,399 A | 3/1992 | Miller et al. |
| 5,268,977 A | 12/1993 | Miller et al. |
| 5,303,125 A | 4/1994 | Miller et al. |
| 5,325,272 A * | 6/1994 | Miller ........................ 362/554 |
| 5,384,881 A | 1/1995 | Miller et al. |
| 5,486,984 A | 1/1996 | Miller et al. |
| 5,907,648 A | 5/1999 | Miller et al. |
| 5,967,653 A | 10/1999 | Miller et al. |
| 5,993,011 A * | 11/1999 | Smock et al. ............... 353/119 |
| 6,350,046 B1 * | 2/2002 | Lau ........................... 362/364 |
| 6,402,349 B1 | 6/2002 | Miller et al. |
| 6,582,104 B2 | 6/2003 | Miller et al. |
| 7,172,132 B2 | 2/2007 | Proffitt et al. |
| 7,177,534 B2 | 2/2007 | Jones et al. |
| 7,188,481 B2 | 3/2007 | DeYoe et al. |
| 7,209,870 B2 | 4/2007 | Simmons et al. |
| 7,223,002 B2 | 5/2007 | Miller et al. |

(Continued)

OTHER PUBLICATIONS

*New Technology*, Power Systems News, L.A. Dept of Water & Power,Jul. 1993.

(Continued)

*Primary Examiner* — Frantz Jules
*Assistant Examiner* — Azim Abdur Rahim

(57) ABSTRACT

This invention integrates energy saving lighting with energy saving HVAC (Heating, Ventilating and Air Conditioning). This system is termed by the inventor "ILAC" (Integrated Lighting and Air Conditioning). An ILAC system includes light fixtures mounted in a ceiling and, emitting lamp heat into a plenum and visible light into a room. A central computer controls both lighting and HVAC systems. In a COOL mode an HVAC unit cools the room through a supply air duct and return air duct, and the lamp heat exits the plenum through an exhaust duct. In a HEAT mode the HVAC heats the room through the same supply air duct, a ceiling-to-plenum duct carries the heated room air into the plenum, and an HVAC return air duct carries room and plenum heat back into the HVAC unit that uses less power to heat the lamp-warmed return air. In a thermostat-controlled OFF mode, warm room air convects through the ceiling duct into the plenum and exhausts through a plenum exhaust duct along with lamp-heated plenum air. Optionally, plenum exhaust duct may include a radiator to transfer plenum heat to pre-heat water entering a remote hot water heater.

6 Claims, 10 Drawing Sheets

U.S. PATENT DOCUMENTS

| | | | | |
|---|---|---|---|---|
| 2003/0031011 | A1* | 2/2003 | Miller et al. | 362/150 |
| 2003/0137846 | A1* | 7/2003 | Wronski | 362/364 |
| 2004/0076393 | A1* | 4/2004 | Singh et al. | 385/128 |
| 2004/0253918 | A1* | 12/2004 | Ezell et al. | 454/239 |
| 2005/0077840 | A1* | 4/2005 | Kazanov et al. | 315/294 |
| 2005/0201089 | A1* | 9/2005 | Lee | 362/227 |

OTHER PUBLICATIONS

*Museum Lighting the Next Generation*, Exhibit Builder magazine, Aug. 1993.

*New lamp Halves Energy*, Progress, Pacific Gas & Electric, L.A., CA, Mar. 1977.

*The Energy Conservation Collection*, Johnson Industries 1992.

*Tri-Mizer* 3-way Energy-Saving Bulb, Ad, Creators, Inc. 1993.

*Tomorrow's Lighting Today* (circline lamps), Montgomery Ward Ad. 1992.

*Field Demonstration, Lighting & HVAC Cost Savings*, Energy Ctr, WI, Jan. 2005.

*Daylighting and Architetecture*, Waldron Lighting Design, PA, Mar. 2007.

*Commercial Rebates & Financial Assistance*, Alameda Power, CA Jul. 2007.

*Building Efficiency* (*thru HVAC efficiency*) Johnson Controls, Inc WI. May 2007.

\* cited by examiner

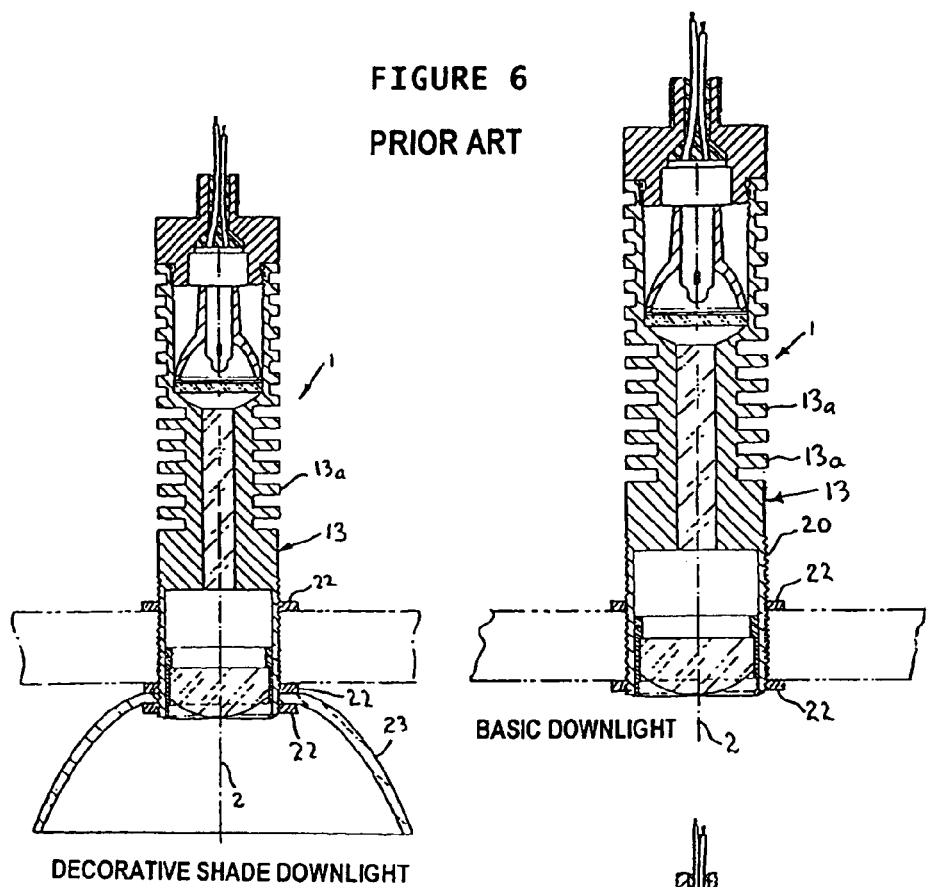
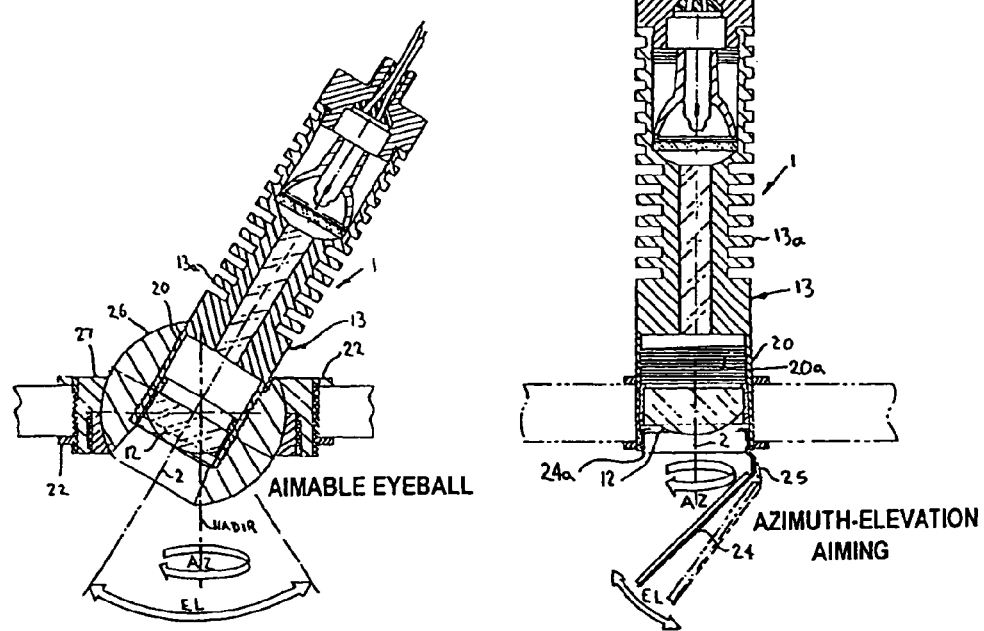
FIGURE 6
PRIOR ART
DECORATIVE SHADE DOWNLIGHT
BASIC DOWNLIGHT
AIMABLE EYEBALL
AZIMUTH-ELEVATION AIMING

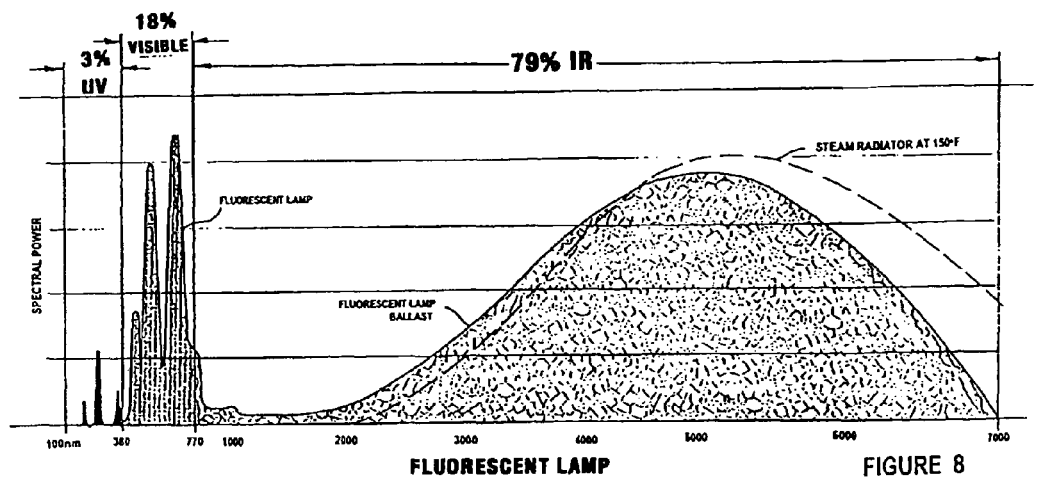
FIGURE 8 — FLUORESCENT LAMP
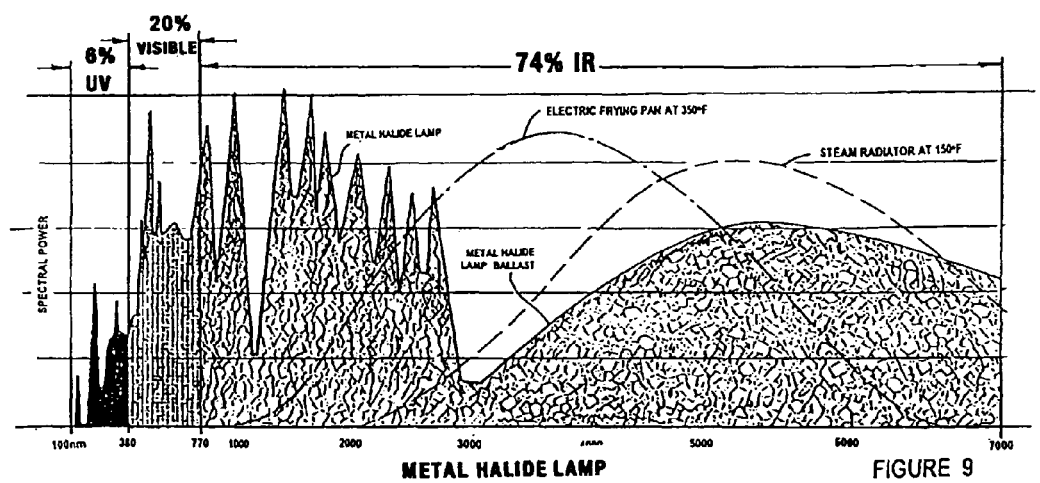
FIGURE 9 — METAL HALIDE LAMP
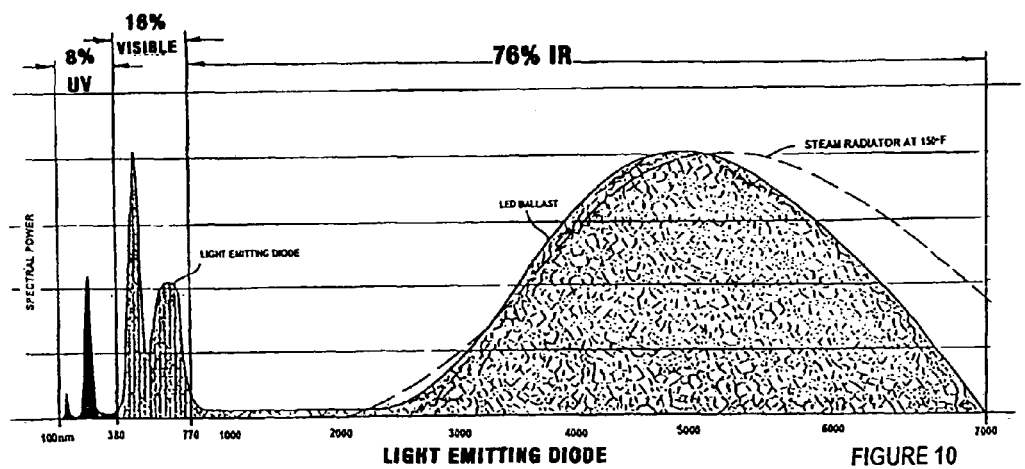
FIGURE 10 — LIGHT EMITTING DIODE

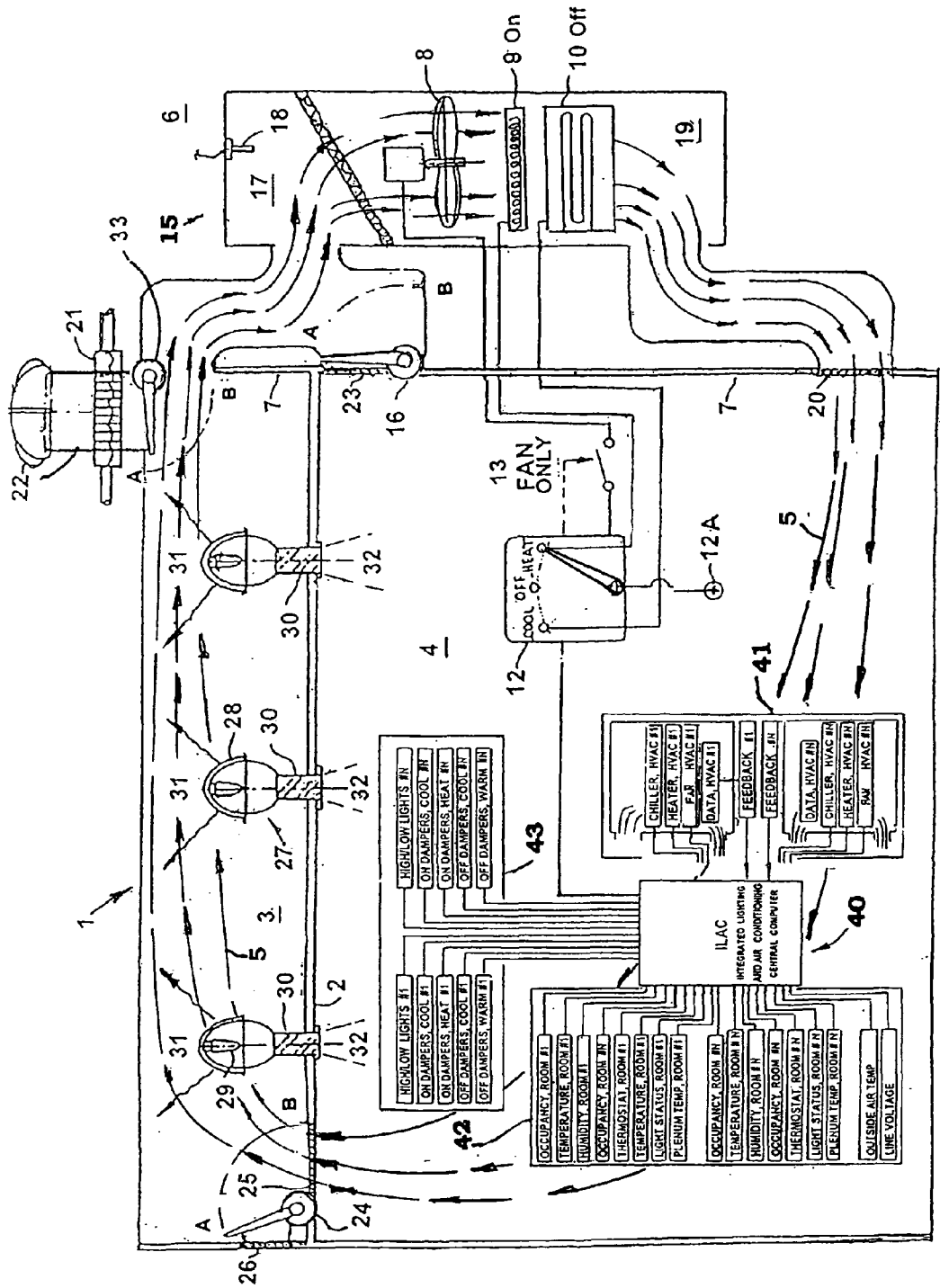
FIGURE 13. SYSTEM ON - HEAT MODE

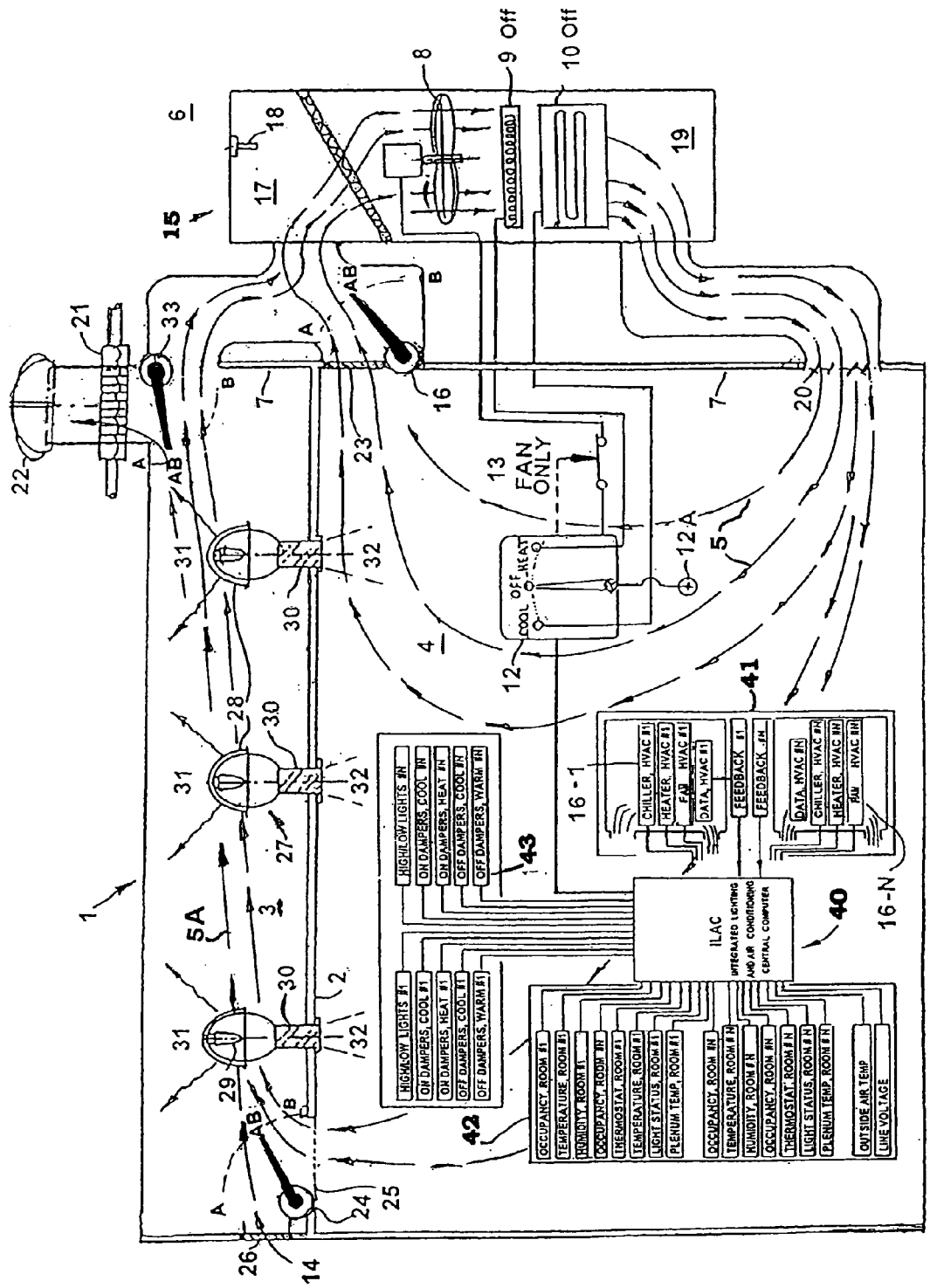
FIGURE 14. SYSTEM OFF - FAN ONLY MODE

ENERGY SAVING INTEGRATED LIGHTING AND HVAC SYSTEM

BACKGROUND OF THE INVENTION

Historically, lighting has been specified by engineers in the IESNA (Illuminating Engineering Society of North America) and air conditioning has been specified by ASHREA (American Society of Heating, Refrigerating and Air-Conditioning) engineers. These diverse practitioners have independently tried to design their respective systems within buildings being designed or already designed (or worse yet already built) to the drawings and specifications of architects of the AIA (American Institute of Architects). A popular architectural trend is the attempt to save lighting energy through "daylighting" (big windows and skylights). The result is poorly controlled daylight that requires energy for separate day-time supplementary use, as well as a complete night-time lighting system. However, double-pane windows and skylights transmit eight times more heat (in or out, depending on the season and weather) than insulated walls or ceilings. Thus savings in lighting energy is often overwhelmed by increased HVAC energy use.

Even in well-insulated buildings with few windows and no skylights, the cost of energy use continues to rise. Both Residential and commercial customers are experiencing dramatically increasing lighting and HVAC costs. Lighting itself averages about 32% of a typical commercial building's energy use, and lighting-plus-air conditioning power (to remove heat generated by the lighting) comprise more than half of most building's total energy load. Thus lighting and HVAC designers (who usually work at different companies in different cities) need to work together to specify energy-saving, effective, integrated lighting and HVAC systems within the architectural designs of proposed, new and old buildings.

It is a well-known fact that all light sources emit many times more IR (infrared) and UV (ultraviolet) energy than visible light watts. It is also a well-known fact that it takes added watts of air conditioning to remove either heat or cooling from a room.

INCANDESCENT LAMPS: Incandescent lamps have changed very little since the carbon-filament, vacuum-filled light bulb was invented 100 years ago by Thomas Edison. It is said that Edison invented a very efficient electric heater that produced 96% heat and emitted only about 4% visible light. Modern tungsten/halogen versions of Edison's lamp still produce only about 10% of their energy as visible light, with the balance almost entirely invisible IR and about 1% UV (ultraviolet). That means a lamp consuming 100 watts, produces 90 watts of UV and IR that contribute nothing to vision, but contribute only to whatever (and whomever) they encounter.

Although incandescent lamps are inefficient in terms of lumens-per-watt, they remain popular because of their light quality. They have a continuous, uninterrupted visual spectrum, or CRI of 100 (Color Rendition Index) providing light similar to sunlight the eye can most efficiently see.

FLUORESCENT LAMPS: Considering integral ballast losses, fluorescent lamps (including compact fluorescent screw-based lamps) are about 3 times more efficient in lumens-per-watt than incandescent lamps, so the light output becomes 6%×3, or about 18% of total lamp energy (instead of 6% for incandescent lamps). Thus they emit 82% heat, and it still takes that 3.5 watts of HVAC to remove a watt of fluorescent (even compact fluorescent) lamp heat. Non-Patent referenced NP-1 through NP-6 show the applicant's familiarity with the properties of fluorescent lamps.

LIGHT SOURCE SUMMARY

The current I.E.S.N.A Handbook published in 2010, states: "UV and IR do not contribute vision, but only contribute to damage, and thus should be avoided." The publication of that information resulted from the applicant's development of light fixtures with no UV or IR.

BRIEF DESCRIPTION OF THE DRAWINGS

FIG. 6 shows light fixtures of U.S. Pat. No. 7,223,002 mounted in a ceiling.
FIG. 8 is the total SPD (Spectral Power Distribution) of a fluorescent lamp, showing visible light, as well as UV and IR.
FIG. 9 is the total Spectral Power Distribution of a metal halide lamp, showing visible light, as well as UV and IR.
FIG. 10 is the total Spectral Power Distribution of an LED (Light Emitting Diode), showing its visible light, as well as UV and IR.
FIG. 13 is a drawing of the SYSTEM ON-HEAT mode of the invention.
FIG. 14 is a drawing of the SYSTEM OFF-FAN ONLY mode of the invention.

DETAILED DESCRIPTION OF THE DRAWINGS

Figure 1:
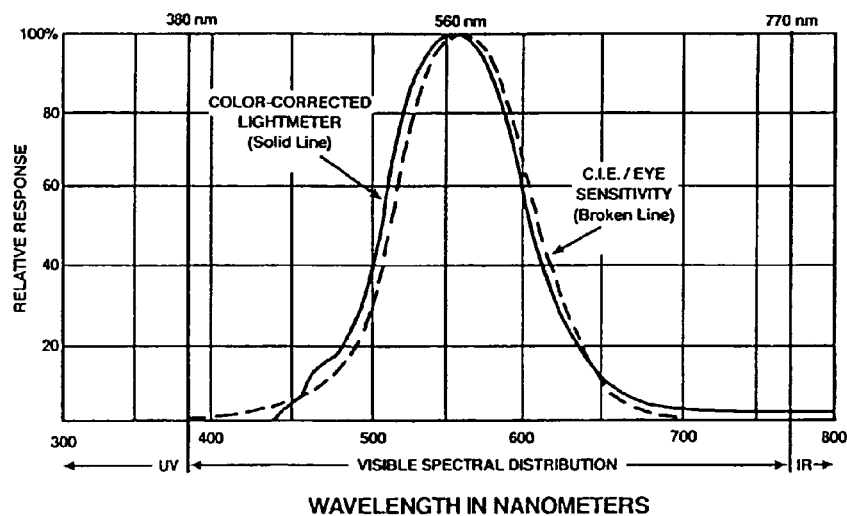
FIG. 1 is the Relative Spectral Sensitivity of the human eye.

In FIG. 1 the Relative Spectral Sensitivity of the human eye is shown as the C.I.E. (Commission International de'l Eclairage) curve represented by the broken line. Since a light meter is intended to indicate the light level that a human can see, the light meter sensitivity is shown as a solid line. The visible spectrum of the eye extends from the UV (ultraviolet) threshold at 380 nm (nanometers wavelength) to the IR (infrared) threshold at 770 nm. Thus the human eye (and the light meter) are both designed to indicate visible light intensity as the area under the C.I.E. curve, wherein light of wavelengths shorter that 380 nm or longer than 770 nm do not produce a visible retinal image in the eye, and are not measurable with a light meter.

Figure 2:
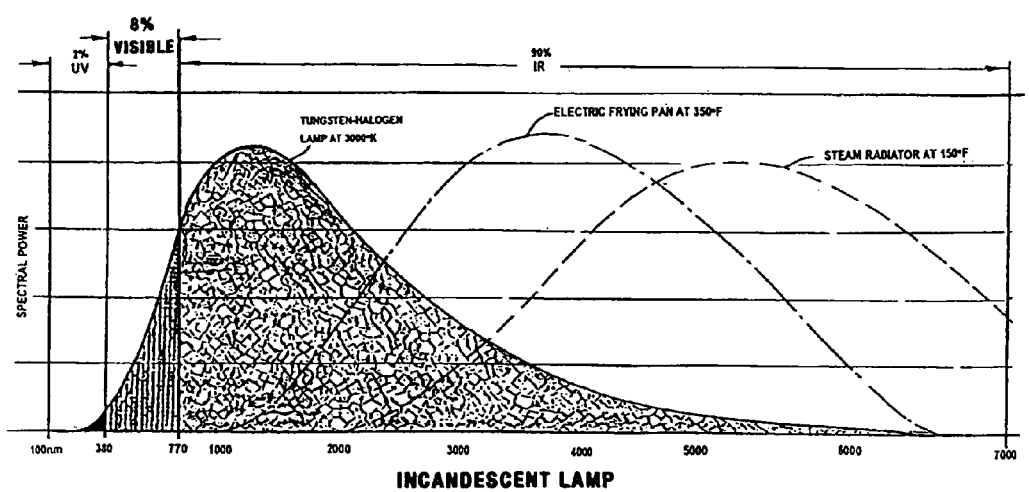
FIG. 2 is the total SPD (Spectral Power Distribution) of an incandescent lamp, including the UV and IR bands.

In FIG. 2 the full spectrum of an incandescent quartz/halogen lamp is shown including UV down to 100 nm and IR extending to 4500 nm. It may be seen that the area under the C.I.E. (visible light sensitivity) curve is only about 8% of the energy under the curve of the total energy emitted by the lamp. This shows that except for a few percent of UV energy, about 90% of the lamp energy is IR (invisible heat) that does not contribute anything to vision, but does contribute to the air conditioning load. In order to illustrate the extent of the IR energy, FIG. 2 also includes the SPD (Spectral Power Distribution) of an electric frying pan at 350° F.

Human vision is produced in the eye by light passing through the lens and iris (the pupil) and projecting an image onto the retina The retina can see only the light with wavelengths between 380 and 770 nm. However, the pupil responds to both UV and IR energy by reducing the iris diameter to protect the retina from damage. Since visible light on the retina is proportional to the area of the iris, removal of UV and IR opens the iris like the f-stop of a camera to produce a brighter retinal image. Thus light without UV or IR provides better vision with less light energy. This was demonstrated in 1993 by a conservator in the Gene Autry Museum in Los Angeles, Calif., where two similar water-color paintings were illuminated side-by-side. One painting was illuminated with a tungsten/halogen museum track light, and the other with light from a fiber optic system with no UV or IR.

The lights in this demonstration were first adjusted to equal intensity in footcandles, measured with a light meter. The painting illuminated without UV or IR appeared substantially brighter, so it was optically dimmed (without lowering the color temperature) so both paintings appeared equally bright to the observers. Then the respective light levels were measured again, wherein the footcandle level of the lights with no UV or IR was approximately half the measured footcandle intensity of the tungsten-halogen tracklight.

The elimination of UV and IR allowed the observers' irises to enlarge and admit more light. A test gallery installation was sponsored by the local electrical utility, and was certified by their engineers as saving 70% of the power used for illumination. In an article in Exhibit Builder Magazine, non-patent reference NP-2, the museum design specialist responsible for a full-gallery demonstration states: "The . . . gallery . . . is perceptibly cooler than other areas of the museum."

Figure 3:
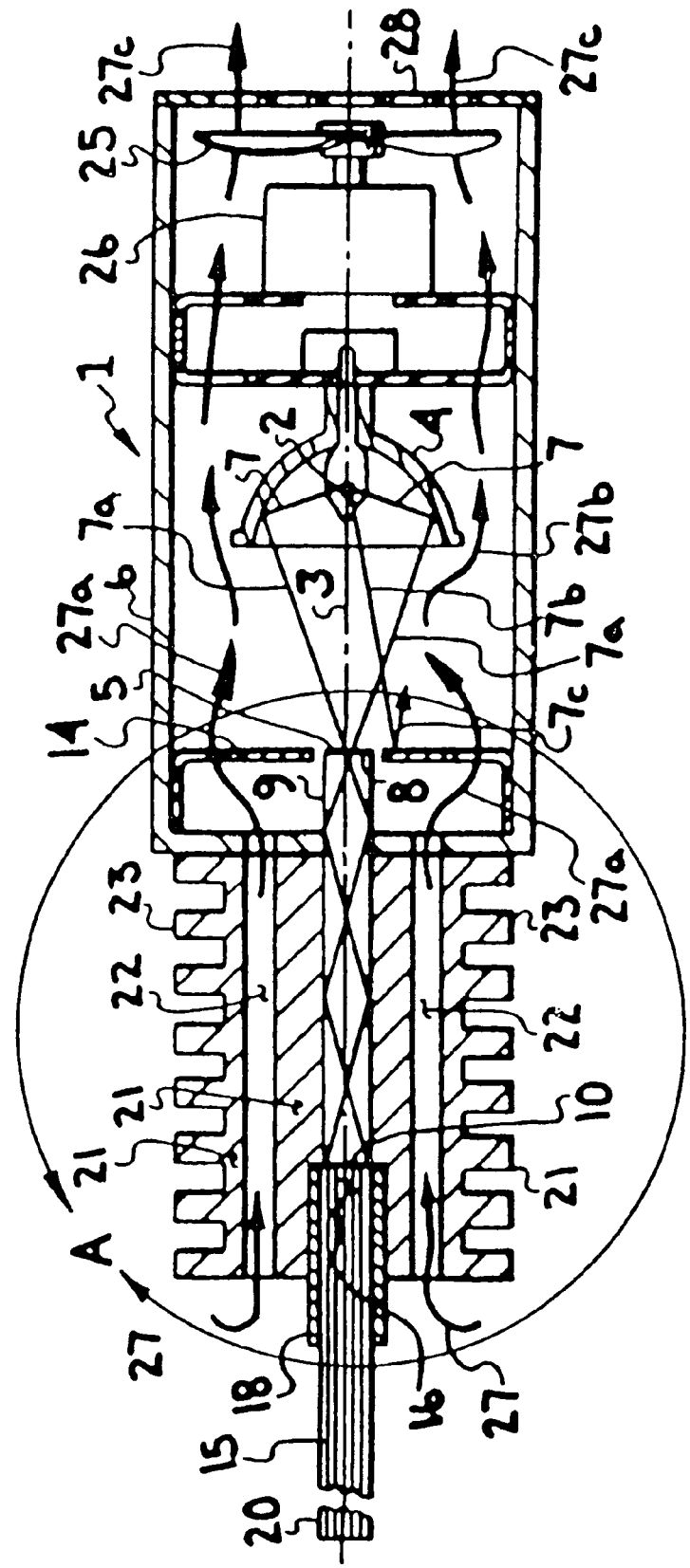
FIG. 3 is an applicant's prior art fiber optics projector of U.S. Pat. No. 5,099,399 that emits no UV or IR energy in the projected light.

FIG. 3 shows U.S. Pat. No. 5,0900,399 that emits zero UV or IR energy. It has been used in many museums to protect artifacts from photochemical damage for over 20 years.

Figure 4:
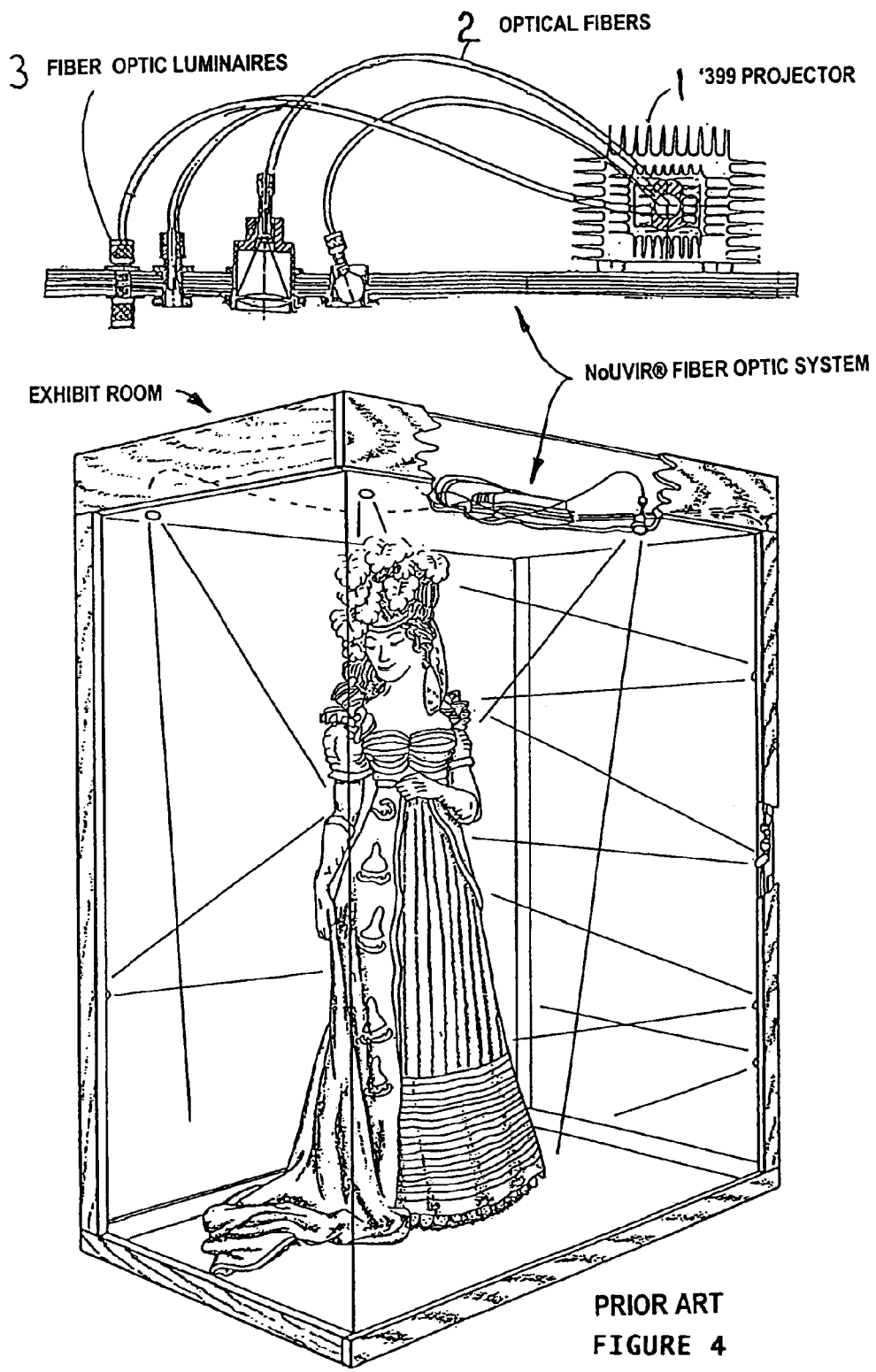
FIG. 4 is the fiber optics projector of '399 patent using several types of fiber optic luminaires in a ceiling.
Figure 5:
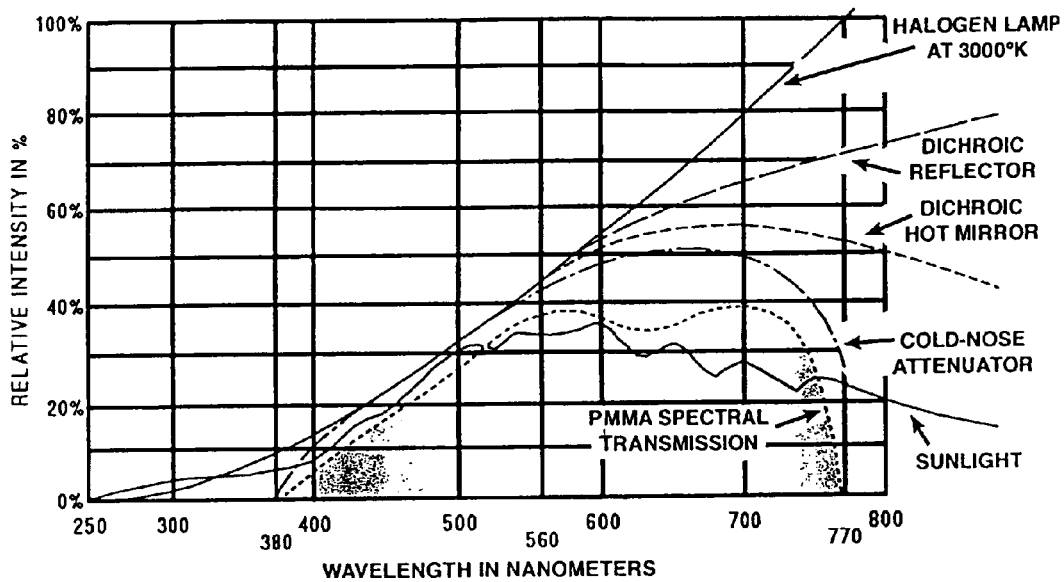
FIG. 5 is a drawing of the visible SPD (Spectral Power Distribution) of the fiber optic projector of FIG. 3, showing visible light, with no UV or IR.

In FIG. 4 a fiber optics illumination system is shown including the light projector (1) of '399 patent in the ceiling of a room-size exhibit case. The projector is mounted above the ceiling and transmits its visible light into the room through optical fibers (2) and fiber optic luminaires (3), as described in U.S. Pat. Nos. 5,486,984; 5,268,977; 5,303,125; 5,384,881 and 5,907,648. Thus all lamp heat is emitted above the ceiling and only cold light (10% of the lamp energy) without UV or IR is emitted into the room. Thus 90% of the lamp energy is emitted outside the exhibit case as shown in FIG. 5, a drawing of the visible SPD (Spectral Power Distribution) of the fiber optic projector of FIG. 3, shown without UV or IR. A series of successive filters removed all UV and IR, leaving only the visible light between 380 to 770 nm. Since the highly-transmissive Pmma (Polymethyl methacrylate) plastic fibers are subject to melting under focussed, IR, removal of the heat from the fiber optic projector light source prevents fiber damage, whereby fibers have been warranted for 10 years without yellowing or losing transmissivity. This light with No UV has been shown to extend the lives of photosensitive museum articles, like documents and textiles, as well as residential and commercial displays by three to eight times longer than conventional light sources. It should be noted that FIG. 5 includes the SPD of direct sunlight, showing the continuous, uninterrupted spectrum producing ideal CRI (Contact Rendition Index, or human color vision). The solar SPD peaks at 560 nm, the green (most easily seen) color shown in FIG. 1. It is not important whether one believes humans were evolved or designed with vision perfectly suited for efficient hunting and foraging in green fields and forests. However, it is very important that the most efficient lighting should replicate the spectrum of sunlight.

FIG. 6 is the light fixture of U.S. Pat. No. 7,223,002, shown in several mounting configurations in a ceiling. The thermal properties are similar to those of applicant's '399 patent, but conventional optical fibers (2) extending from fiber optic projector (1) are not used. Instead, the same heat-removing optical element (a thick, fiber-like rod) used in a fiber optic projector (1) of FIG. 4 of the '399 patent is used to absorb heat from the intense focussed light and dissipate it into the plenum above a ceiling. Thus the invention of the '002 patent is entitled a "hybrid" fiber optic luminaire. It should be noted that the downlights of FIG. 6 are prior art luminaires with added elements of the present invention.

Figure 7:
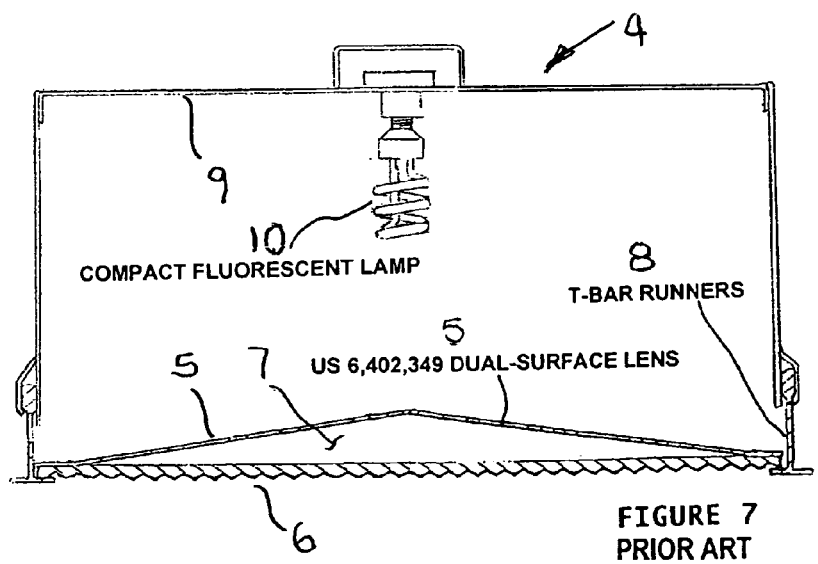
FIG. 7 shows a fluorescent fixture above a luminous ceiling including U.S. Pat. No. 6,402,349, mounted on suspended ceiling T-bars.

FIG. 7 shows a fluorescent light fixture (4) in a luminous (light-transmitting) ceiling on which an upper transparent acrylic lens (5) of U.S. Pat. No. 6,402,394 is spaced above a lower diffusing lens (6). The pair of lenses with an airspace (7) therebetween rests on the horizontal portions of suspended-ceiling T-bar beams (8). A horizontal reflector (9) is mounted on ceiling T-bar runners (8) spaced above the lenses. A light source emitting visible light, plus UV and IR, is mounted under the reflector. The light source shown in the '394 patent is a pair of straight-tube fluorescent lamps, but FIG. 7 shows a spiral compact fluorescent lamp (10). However other lamps; metal halide, incandescent or even LED's may be used, providing they do not emit high IR levels that could melt the plastic lenses. Then visible lamp light passes through the lenses, but IR and UV are blocked. Once again, it should be noted that the downlights of FIG. 7 are prior art luminaires comprising only one element of the present invention.

In FIG. 8 the full spectrum of a fluorescent lamp is shown, including about 18% visible light (shown in the form of narrow spikes) in the band between 380 and 770 nm wavelength, 6% UV and approximately 76% (depending on configuration and manufacturer) IR (including ballast losses shown in typical black-body distribution). It is well known by lighting scientists that the retina of the human eye has three types of color sensing cones, each respectively sensing "RGB" (Red, Green and Blue) light. This "tri-stimulus" lamp principle, uses eye-sensitivity peaks at the respective RGB wavelengths of red light at 650 nm; green light at 550 nm and blue light at 450 nm to match the color sensitivity of the cones of the human eye. The RGB principle is also used for phosphors in color TV screens, computer monitors and cell phones.

However, in addition to the visible RGB light, the full spectrum of the fluorescent lamp also includes the UV energy, having wavelengths as short as 150 nm, and the IR heat having wavelengths longer than 770 nm, extending past 6000 nm. Those invisible wavelengths are known by the I.E.S.N.A. as contributing to damage to retail merchandise and even foods.

In FIG. 9 the SPD of a metal halide High-Intensity Discharge (HID) lamp is shown having approximately 76% IR output. Thus a standard 40 watt lamp emits 30 watts of IR heat, and each watt must be removed with air conditioning. Also it can be seen that (as in fluorescent lamps) there are high UV emissions from such lamps. Damage caused when a UV photon is absorbed by an atom of a molecule. The entering photon changes the valence electron ring of an atom and thereby alters the chemical structure of the molecule. This transition produces heat as well as chemical change, as anyone knows who has experienced a painful sunburn.

In FIG. 10 the SPD of a Light-Emitting Diode (LED) lamp is shown having approximately 76% IR output that must be removed with of air conditioning power. Also, it can be seen that SPDs (as in fluorescent lamps and HID lamps) show high UV. Although the UV spikes are narrow, they comprise very energetic, deep radiation that can cause severe fading and structural damage when absorbed by photosensitive objects. Notice in FIG. 10 that has a very high "blue spike" at 450 nm that is now being recognized as causing macular degeneration in the retina of the eye.

Figure 11:
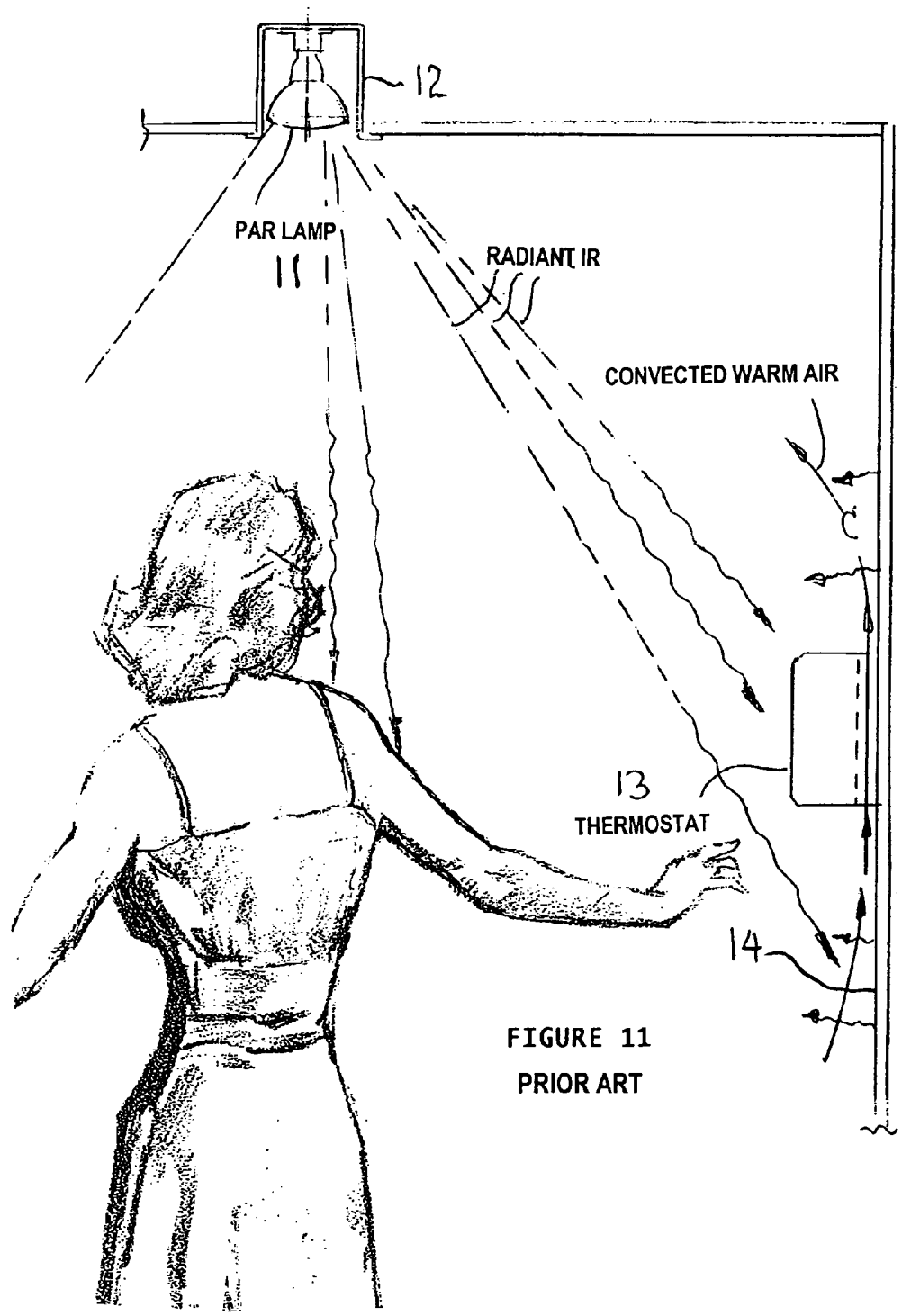
FIG. 11 is an illustration of a lamp showing its visible light, as well as UV and IR, irradiating a thermostat mounted on a wall.

FIG. 11 is an illustration of a lamp within a room and showing its visible light, as well as UV and IR, irradiating a thermostat mounted on a wall. In this illustration a "PAR lamp" (Parabolic Reflector lamp) (11) is shown in a "top hat" recessed fixture (12). This is a widely-used combination in both residential and commercial buildings. A portion of the lamp IR is absorbed into a thermostat (13) and all the wall and floor surfaces (14) to cause the thermostat to sense the radiant IR heat instead of the room air temperature. Thus the room may easily be an ideal 68° F., but the thermostat "thinks" the room is 72° F., several degrees warmer than it really is. That initiates HVAC cooling when the room air is already at a comfortable temperature. Then the HVAC cooling continues over a time lag period until the thermostat and room surfaces cool to the set air temperature.

In addition to the thermostat, human skin is also sensitive to IR radiation. Thus the girl in the summer dress in FIG. 11 doesn't really care what the thermostat says. She feels the IR on her skin and responds by turning down the temperature setting of the thermostat. She and the thermostat both agree that the room is "too hot". Therefore, in order to have accurate room air temperature to control an HVAC unit, all IR should be excluded from the room lighting.

The girl in FIG. 11 also calls attention to the fact the ILAC term includes "Integrated Lighting and Air Conditioning". That includes the need for occupancy data as described below and shown in FIG. 12 below. Even at low levels reducing lighting to an OSHA minimum of 1.5 fc in unoccupied spaces may not appear as major factors, but every improvement in ILAC efficiency results in an incremental power saving.

Figure 12:
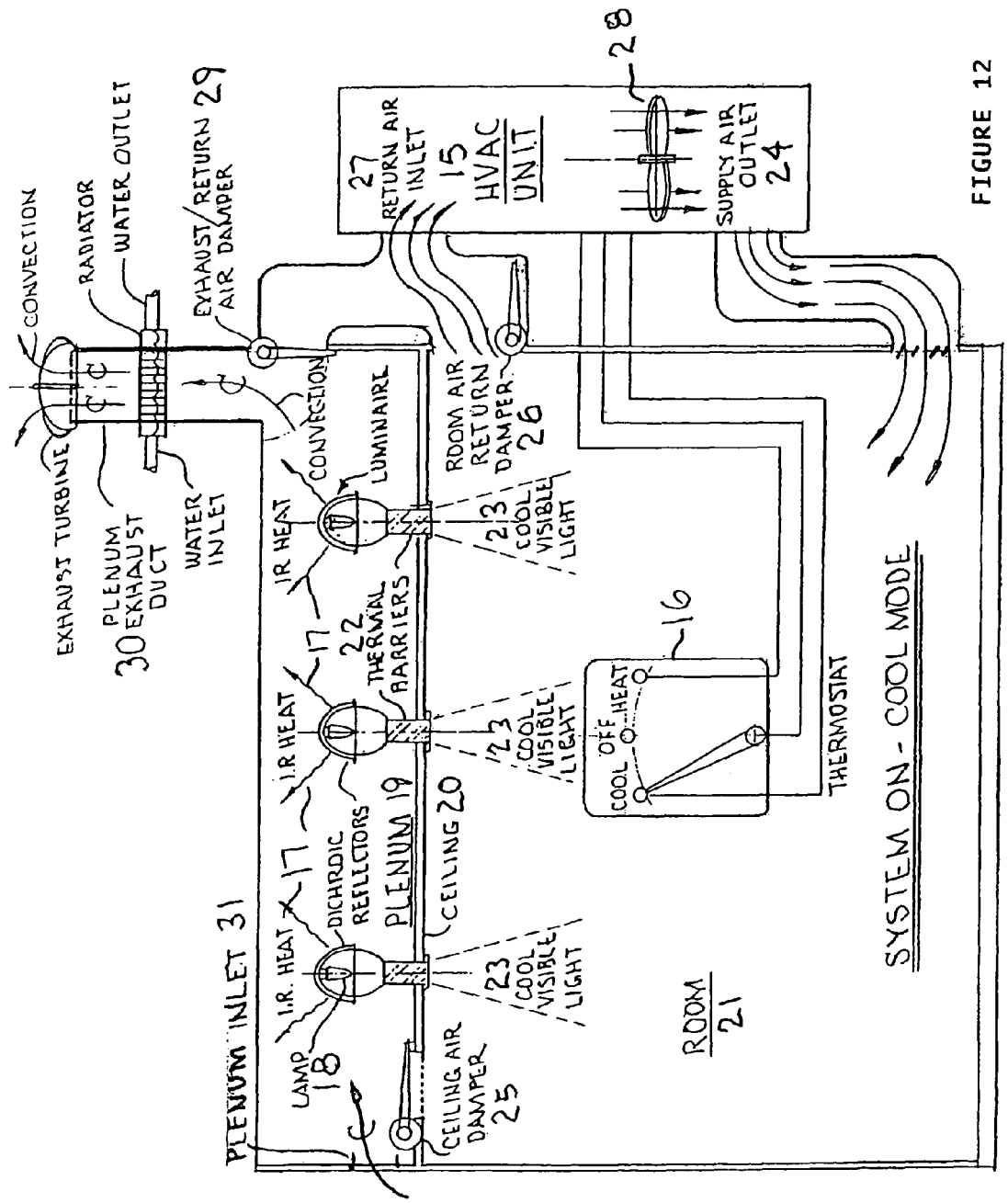
FIG. 12 is a drawing of the SYSTEM ON COOL mode of the invention.

FIG. 12 according to the present invention is shown with the HVAC unit (15) in the "SYSTEM ON—COOL MODE". In this mode the thermostat (12) is set to cool the room to a desired room temperature. The optimum HVAC energy efficiency is obtained by isolating the IR heat (31) from luminaires (27) within plenum (3) above the ceiling (2) of a room (4).

Each luminaire (27) includes a lamp (29) within a reflector (28) that focuses light (32) onto a thermal barrier (30). Thermal barrier (30) blocks IR heat and transmits only cool, visible light (32) into the room. Reflector (28) also emits lamp heat (31) into the plenum (3). The HVAC unit (15) includes a fan (8) that cools the room air by blowing air through a non-operating heater (8) and through an operating chiller (10) through an HVAC exhaust (19). Cool air then passes through an HVAC room air inlet register (20) and into the room (4).

The HVAC fan (8) further drives air flow, designated by parallel arrows into an HVAC inlet (17) in a closed loop air path through room (4) and the HVAC unit (15). The room temperature is controlled in the central computer by comparing the thermostat temperature stored in the computer sensor data input (42) to the HVAC temperature feedback entered in the HVAC commands and feedback (41) as received from the HVAC inlet temperature sensor (18), Room/plenum air damper (24) closes room/plenum register (25) and opens the outside air register (26) allowing outside air flow (14) to convect lamp heat through the plenum and upward through the plenum exhaust stack and turbine (22) and plenum exhaust damper (33). Plenum exhaust damper (33) also the closes off the plenum from the HVAC unit (15), whereby lamp heat does not enter the HVAC inlet (17). Thus no cooled HVAC air enters the plenum, and no lamp heat in the plenum will enter the room.

The central computer (40) receives room cooling commands from the thermostat, and then controls the HVAC unit (15) based on environmental inputs (42) and further controls room ambient properties with damper controls (43). The system thus operates with only 3 dampers; damper (24) that closes cooled room air from entering the plenum and opens to allow outside air to enter the plenum to cool the lamps; damper (16) that is open to allow cooled room air to enter the HVAC air inlet for further cooling; and damper (33) that is open to lamp heat convection and closed to prevent lamp heat from entering the HVAC inlet (17). As lamp heat (31) convects into plenum exhaust stack, it may pre-heat a hot water radiator (21).

In FIG. 13 the ILAC system according to the present invention is shown with the HVAC (15) unit in the "SYSTEM ON—HEAT MODE" with thermostat (12) is set to "HEAT". Optimum HVAC efficiency conserves the IR heat (31) from lamps (29) in plenum (3) above ceiling (2) of room (4). Ceiling air damper (24) is open, so warm room air enters plenum (3), mixes with and receives the heat of light (31) and returns to the HVAC unit (15) through open exhaust/return air damper (33) into return air inlet (17) of HVAC unit (15). The HVAC unit further heats the warm plenum air, and blower motor (8) blows warm air into the room (4) through supply air outlet (19). The lamp heat in the plenum is precluded from exhausting by exhaust/return air damper (33), closing off plenum exhaust duct and turbine (22) causing the warm plenum air to enter the HVAC unit through the return air inlet (17). Thus the entire closed loop of warm air (5) circulates through room (4), plenum (3) through HVAC unit (15) and back to the room (4).

FIG. 14 shows the ILAC system according to the present invention with the air conditioner unit (15) in the SYSTEM OFF—FAN ONLY MODE. This may be a manual setting of thermostat (12 fan only switch (13) or may be an HVAC quiescent time in which the thermostat is at the set temperature wherein there is no command to either heat or cool the room. In this mode the optimum energy efficiency can be obtained by allowing warm room air to convect from room (4) into two closed loops. In the first closed loop room air (5) is drawn into HVAC inlet (17) by fan motor (8), inoperative HEATER (9) and COOLER (10) through HVAC exhaust duct (19) and returns to room (4), In the second closed loop a portion of the room air (5) is drawn past partially open damper (24) and into plenum (3), where some outside air (5A) is mixed in the plenum. Outside air 5A and room air (5) cool lamp heat (31) and are split by partly open damper (33) and convect lamp heat upwards through exhaust duct and facilitated by wind turbine (22). The position of the outside damper air position AB is determined by the relative room air temperature (5) and plenum air temperature (5A). Thus, more outside air (14) will be used to cool the room during cold weather, and less outside air (14) will be used to cool the room during warm weather. If necessary, the computer may maintain a desired room temperature by temporarily using the heater (9) or chiller (10).

Greater utilization of a waste lamp heat may be obtained using a heat-exchange radiator (21) in plenum exhaust duct (22). The radiator water inlet (21) is supplied with cold (unheated) water. The central computer control (42) includes means to adjust electrical demand, such as needed for light

(29) dimming and/or switching based on occupancy or activities, and changes in equipment uses (such as computers, printersn etc.) The water supply may be pre-heated by plenum exhaust air and electrically or gas heated by computer controls (42).

The fan may vary air flow speed the to use very little power through an air temperature sensor (18) in the HVAC unlet (17).

SUMMARY OF THE INVENTION

As the energy costs in buildings continue to escalate, the present invention dramatically reduces those costs of through ILAC (Integrated Lighting and Air Conditioning) by:
1. Reducing HVAC cooling load by excluding lamp heat from rooms;
2. Lowering HVAC heating by recycling lamp heat to the HVAC system;
3. Improving occupant comfort without using additional power;
4. Utilizing lamp heat in other heating applications in the building;
5. Shortening HVAC cycles by managing light and heat;
6. Reducing installed size, cost, ducting and power of HVAC units;
7. Low cost and reliability achieved with only 1 fan and 3 dampers.

The invention claimed is:
1. An integrated lighting and HVAC (Heating, Ventilating and Air Conditioning) system (1) for one or more rooms (4), having a heat-insulating ceiling (2) separating each said room from a plenum (3);
   at least one lamp (29) mounted above each ceiling, said lamps emitting lamp IR (31) into the plenum above said room and emitting only visible light (32), substantially without heat, through one or more thermal barriers (30), into said room (4);
   a number of ventilation registers (20, 23, 25), connecting said rooms and plenums to one or more HVAC units (5), remotely operated dampers (16, 24, 33); and
   a thermostat (12) and central computer (40) operating said HVAC units (5) and damper controls (43) to optimize energy use based on HVAC feedback (41 and environmental sensor inputs (42).

2. An integrated lighting and HVAC system according to claim 1 in which the environmental sensor inputs (42) are selected from the group including:
   room occupancy, thermostat temperature, room humidity, plenum temperature, light status, outside air temperature; and
   HVAC (41) performance feedback data is selected from the group including HVAC input air temperature, supply air outlet temperature, heater temperature, chiller temperature, air outlet humidity, air velocity and HVAC line voltage.

3. An integrated lighting and HVAC system according to claim 1 in which each said HVAC unit (5) includes a fan (8) circulating conditioned air in a closed loop (5) from an HVAC inlet (17), through a heater (9) or chiller (10), into an HVAC exhaust (19) and HVAC room air register (20), through said room (4), into a room exhaust register (23) and returning into said HVAC inlet 17).

4. An integrated lighting and HVAC system according to claim 1 operating in a COOL MODE in which said plenum (3) comprises a convection air path whereby outside air (14) enters said plenum, cools lamp heat (31) radiated from luminaire reflectors (28), whereby lamp heat (31) is exhausted by convection through a plenum exhaust stack (22).

5. An integrated lighting and HVAC system according to claim 1 operating in a HEAT MODE in which said plenum (3) completes a closed loop air path whereby room air (14) enters said plenum, absorbs lamp heat (31) radiated from luminaire reflectors (28); and wherein lamp heat (31) is conducted as preheated air into HVAC inlet 17.

6. An integrated lighting and HVAC system according to claim 1 in which said fan (8) is energized by a FAN ONLY switch (13) without said heater (9) or chiller (10) energized, whereby the HVAC fan (8) circulates air in a closed loop through said room (4) and HVAC unit (15), and said central computer entrains outside air (14) based on room and outside air temperatures.

* * * * *